June 20, 1950  A. E. JOHNSON  2,512,023
FRAME DISPLAY
Filed Feb. 10, 1947  2 Sheets-Sheet 1
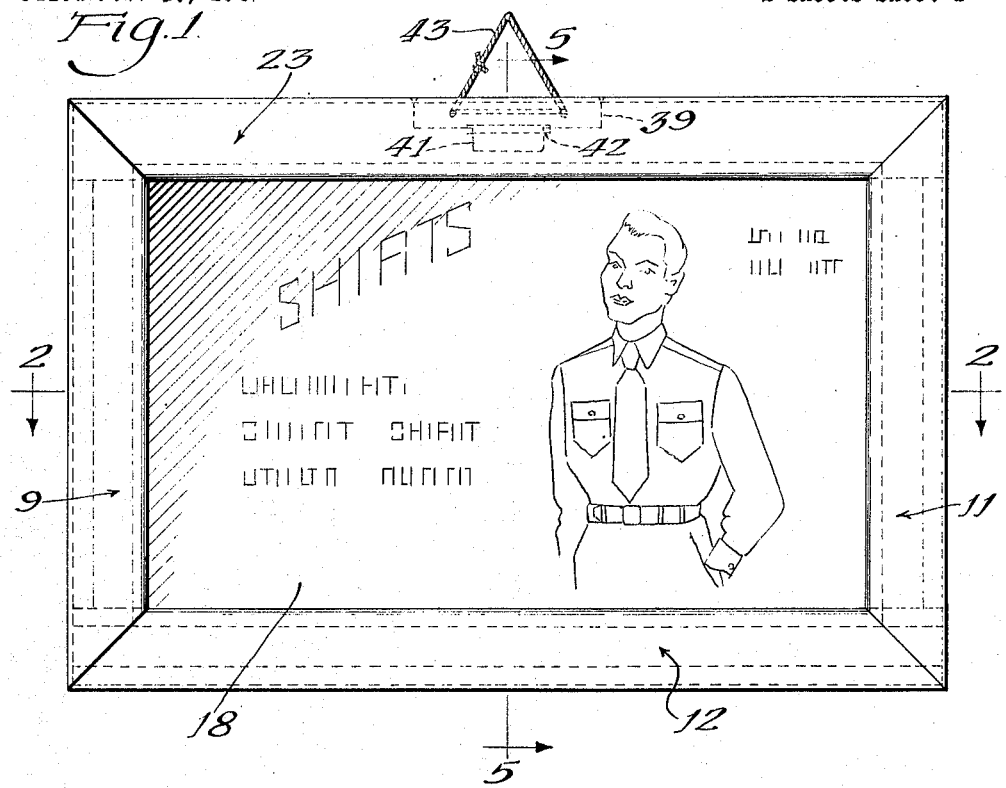
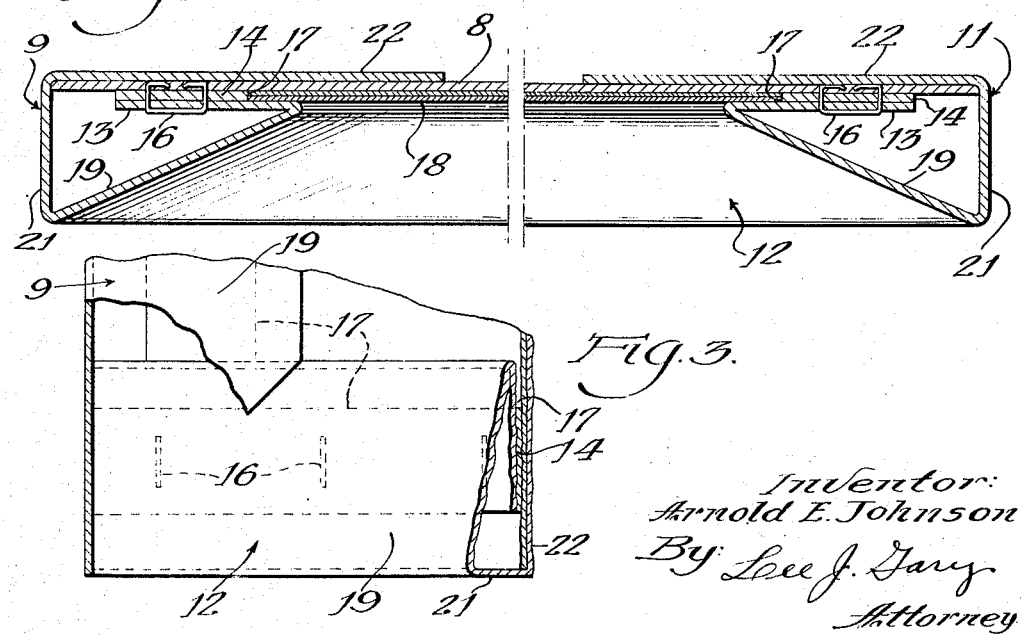
Inventor:
Arnold E. Johnson
By Lee J. Gary
Attorney June 20, 1950 A. E. JOHNSON 2,512,023
FRAME DISPLAY
Filed Feb. 10, 1947 2 Sheets-Sheet 2
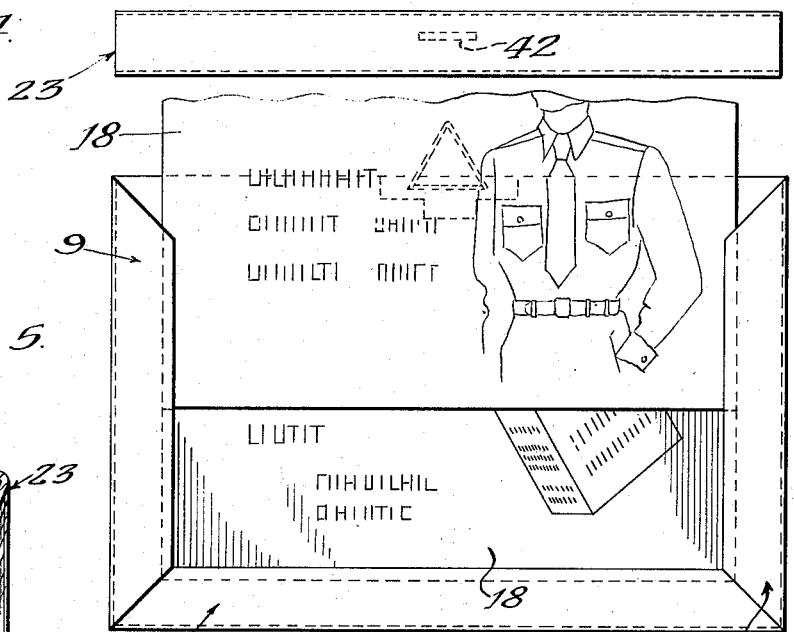
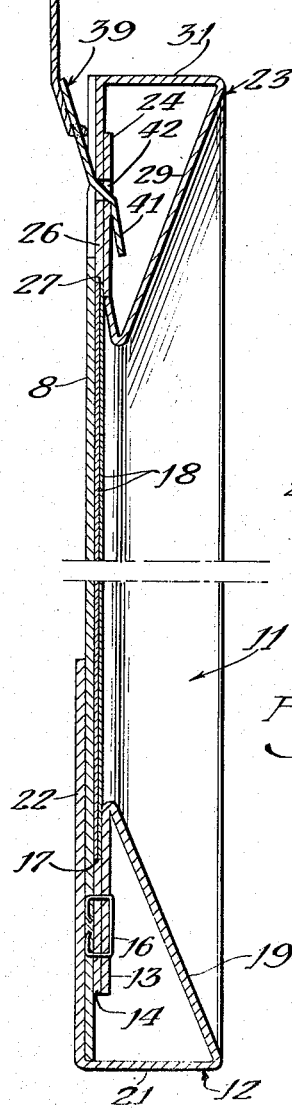
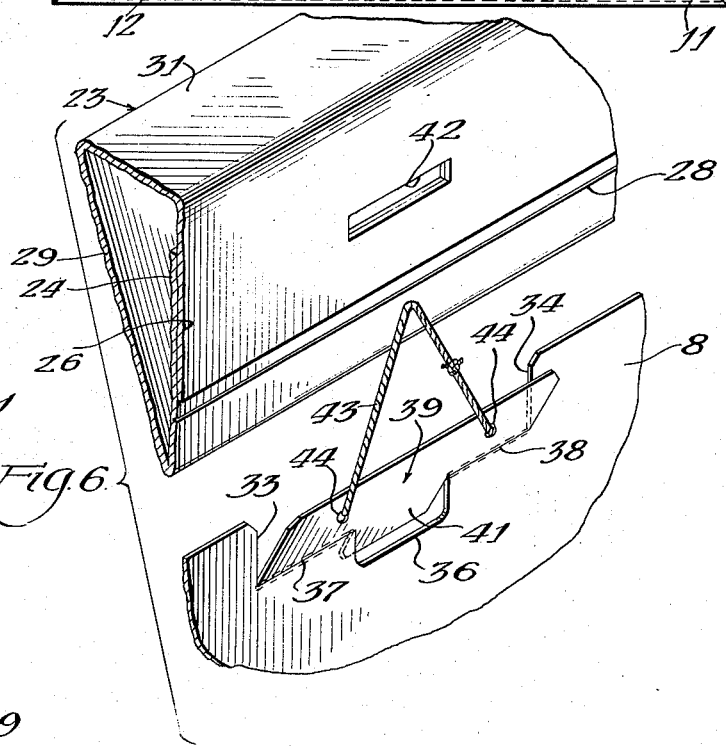
Inventor:
Arnold E. Johnson
By: Lee J. Gary
Attorney Patented June 20, 1950

2,512,023

UNITED STATES PATENT OFFICE 2,512,023

FRAME DISPLAY

Arnold E. Johnson, Chicago, Ill., assignor to Arvey Corporation, Chicago, Ill., a corporation of Illinois Application February 10, 1947, Serial No. 727,569

3 Claims. (Cl. 40—154)

This invention relates to frame displays of the type adapted to receive and support a display sheet bearing suitable printed advertising matter, and has for an object the provision of a framed display in which a display sheet may readily be removed for replacement by other display sheets bearing different advertising matter.

It is another object of this invention to provide a frame display embodying a frame section which may readily be removed to permit withdrawal or insertion of display sheets.

It is a further object of this invention to provide improved means for detachably connecting the removable frame section to the frame display.

It is a further object of this invention to provide a frame display in which a back section and the frame sections form a recess to receive the marginal edges of one or more display sheets.

This invention further contemplates the provision of a frame display which is relatively simple and inexpensive in construction and provides an attractive mounting for printed sheets of advertising matter.

This invention embodies other novel features, details of construction and arrangement of parts which are hereinafter set forth in the specification and claims and illustrated in the accompanying drawings wherein:

Fig. 1 is a front elevational view showing a frame display embodying features of this invention.

Fig. 2 is a sectional view taken along the line 2—2 of Fig. 1.

Fig. 3 is an enlarged fragmentary view, partly in section and partly in front elevation, showing the lower left-hand corner of the frame display illustrated in Fig. 1.

Fig. 4 is a front elevational view illustrating the manner in which the upper frame section is removed from the frame display to permit insertion or withdrawal of a display sheet.

Fig. 5 is a transverse sectional view taken along the line 5—5 of Fig. 1.

Fig. 6 is an enlarged fragmentary perspective view illustrating the means employed for detachably engaging the upper frame section to the frame display.

Referring now to the drawings for a better understanding of this invention, the frame display is shown as comprising a back panel 8 having side frame sections 9 and 11 and bottom frame section 12 attached thereto. The frame sections 9, 11 and 12 each comprise an inner attachment flap 13 secured in spaced relation to the front face of the back panel 8 by means of spacing strips 14 and clips 16 to form a recess 17 to receive the marginal edges of display sheets 18. The frame sections 9, 11 and 12 also embody inwardly sloping front portions 19, side portions 21 and a back flap portion 22, the back flap portion 22 preferably being adhesively united to the back face of the back panel 8.

A top frame section 23 formed of sheet material cut and scored to form a triangular cross-section is adapted to be inserted downwardly between the back panel 8 and the front walls 19 of the side frame sections 9 and 11. In constructing the top frame section 23, the longitudinal edges 24 and 26 of the sheet material are adhesively united in overlapping relation, as illustrated in Figs. 5 and 6 to form with the back panel 8 a recess 27 to receive the upper marginal edge of the display sheets 18. To facilitate gluing the edges 24 and 26 together, the sheet material may be scored along the line 28 in order that the top frame section 23 may be flattened with front wall 29 and top wall 31 disposed in flat parallel alignment against the overlapping edges 24 and 26.

The back panel 8 is preferably formed of flexible sheet material, such as cardboard, and cut along the lines 33, 34 and 36 and scored along the lines 37 and 38 to provide a locking flap 39 hingedly connected to the back panel 8 and having a locking tongue 41 for engagement in elongated slot 42 formed in the back wall of the top frame section 23. The frame display is adapted to be supported upon a nail by means of a loop of string 43 passing through apertures 44 formed in the flap 39.

During the use of the frame display, it will be noted that the top frame section 23 may readily be removed by merely hinging the flap 39 downwardly against the back face of the back panel 8. When the top frame section 23 is removed from the display, display sheets 18 may be withdrawn from or inserted into position upon the display with their marginal edges confined within the recesses 17 defined by the back panel 8 and frame sections 9, 11 and 12. In mounting top frame section 23 in position upon the display, the flap 39 is moved to inverted position with the locking tongue 41 projecting upwardly for engagement within the slot 42. During further inward movement of the top frame section 23, the locking flap 39 is pivoted to its locking position illustrated in Fig. 5 to hold the top frame section against displacement from the display. The display is then suspended from a nail or the like by means of the loop of string 43. When the top frame section 23 is in its assembled position, it coacts with the back panel 8 to define a recess 27 to receive and engage the upper marginal edges of display sheets 18. It will further be noted that the ends of the top frame section 23 are adapted to be confined between the back panel 8 and the front walls 19 of the side frame sections 9 and 11.

It will be noted that a frame display of the type shown and described may be inexpensively formed of flexible sheet material, such as cardboard, to form a simple and attractive frame display adapted to receive printed sheets of advertising matter, and that such sheets may readily be withdrawn and replaced by other sheets by merely removing the top frame section 23. It will further be noted that the frame display is provided with an improved means for holding the top frame section 23 in assembled relation upon the display.

While this invention has been shown in but one form, it is obvious to those skilled in the art that it is not so limited but is susceptible of various changes and modifications without departing from the spirit and scope of the claimed invention.

I claim as my invention:

1. In a frame display, a back panel, side and bottom frame sections each formed of flexible sheet material cut and scored to provide an inner flap secured to the front face of said back panel, a front wall angularly disposed with respect to said back panel, a side wall extending rearwardly from said front wall, and a back flap secured to the back face of said back panel, a top frame section constructed as an individual unit for movement into and out of engagement between said back panel and the angularly disposed front walls of said side frame sections, and a locking flap hingedly connected to said back panel to engage said top frame section against displacement from the display.

2. In a frame display, a back panel of flexible sheet material, side and bottom frame sections each formed of flexible sheet material cut and scored to provide an inner flap secured to the front face of said back panel, a front wall angularly disposed with respect to said back panel, a side wall extending rearwardly from said front wall, and a back flap secured to the back face of said back panel, a top frame section constructed as an individual unit for movement into and out of engagement between said back panel and the angularly disposed front walls of said side frame sections, said back panel being cut and scored to form a hingedly connected locking flap to detachably engage said top frame section upon the display, said top frame section being formed with a slot in its back wall, and said locking flap being formed with a tongue for locking engagement in the slot formed in the top frame section.

3. In a frame display, a back panel of flexible sheet material, side and bottom frame sections each formed of flexible sheet material cut and scored to provide an inner flap secured to the front face of said back panel, a front wall angularly disposed with respect to said back panel, a side wall extending rearwardly from said front wall, and a back flap secured to the back face of said back panel, a top frame section constructed as an individual unit for movement into and out of engagement between said back panel and the angularly disposed front walls of said side frame sections, said back panel being cut and scored to form a hingedly connected locking flap to detachably engage said top frame section upon the display, said top frame section being formed with a slot in its back wall, said locking flap being formed with a tongue for locking engagement in the slot formed in the top frame section, said back panel and frame sections being formed and arranged to define recesses to receive and engage the marginal edges of sheets to be displayed.

ARNOLD E. JOHNSON.

REFERENCES CITED

The following references are of record in the file of this patent:

UNITED STATES PATENTS

| Number | Name | Date |
|---|---|---|
| 102,296 | Mignet | Apr. 26, 1870 |
| 755,267 | Wiskott | Mar. 22, 1904 |
| 1,223,409 | McMillan | Apr. 24, 1917 |
| 2,344,008 | Trogman | Mar. 14, 1944 |
| 2,395,369 | Burr | Feb. 19, 1946 |
| 2,408,532 | Roach | Oct. 1, 1946 |